US005394815A

United States Patent [19]

Hansen

[11] Patent Number: 5,394,815

[45] Date of Patent: Mar. 7, 1995

[54] TOOL

[76] Inventor: Viggo P. Hansen, 20638 Septo, Chatsworth, Calif. 91311

[21] Appl. No.: 179,258

[22] Filed: Jan. 10, 1994

[51] Int. Cl.$^{6}$ .............................................. A01K 69/017

[52] U.S. Cl. .................................... 114/102; 242/323; 242/250

[58] Field of Search ............... 114/343, 102, 103, 104; 242/53, 250, 323, 47; 411/401, 403

[56] References Cited

U.S. PATENT DOCUMENTS 4,269,246 5/1981 Larson et al. ........................ 411/403
4,728,048 3/1988 Batson .................................. 242/53
4,951,890 8/1990 Sossamon .............................. 242/47
4,962,901 10/1990 Shirley et al. ........................ 242/323

OTHER PUBLICATIONS

Marine Supply Company, p. 242, 1988, Collingswood N.J.

*Primary Examiner*—Stephen P. Avila

[57] ABSTRACT

An adaptor for replacing the crank used with a manually operated nautical winch used on sail boats. The adaptor has a body shaped to correspond to the shape of the head of the usual crank that rotates the drum of the winch. This adaptor fits into the crank head receiving socket of the nautical winch. A stem projects upward from the adaptor for connection with the chuck of a drill whereby operation of the drill rotates the drum of the nautical winch and winds the ropes of the sail onto the drum, thereby raising the sail.

5 Claims, 1 Drawing Sheet

TOOL

TOOL

This inventions relates to a tool, and more particularly to a portable adaptor for converting manually operated nautical winches designed to be actuated by a crank to a powered nautical winch.

FEDERALLY SPONSORED RESEARCH

No part of this patent application was developed with the aid of any federally sponsored research and development.

BACKGROUND AND RELATED ART

Manually operated nautical winches mounted on sail boats comprise a drum on which ropes connected to the sails are wound. They include a crank connected to the drum for rotating it. The manually operated nautical winches are provided with a crank head receiving socket shaped to receive the head of a crank. When the head of the crank is inserted in the head receiving socket, manual rotation of the crank winds the rope on the drum thereby raising the sail. However the weight of the sails requires a substantial effort so that the drum in manually operated nautical winches is rotated slowly and depending on the strength of the crew, the effort required may be too much. However there is an advantage in using a manually operated crank that rotates the drum slowly, because if the rope falls off the drum, the slowly rotating drum can be quickly stopped and the rope can be repositioned on the drum before it is frayed. If the rope is frayed or torn, a great deal of time, effort, and cost is required to attach another rope to the sail.

Of course if manually operated nautical winches are already in place on the boat they could be economically modified and provided with power. However if this is done the drum may rotate too fast so that if the rope falls off the drum, the rope can be chewed up by the winch before the winch can be stopped.

DESCRIPTION OF PRIOR ART

Heretofore a number of winches or winding devices have been developed. For Example, U.S. Pat. No. 4,290,584 to Eckles discloses a powered portable winch which could be used to raise sails or anchors. However, in Eckles, the tool head 44 is an integral extension of the transmission drive shaft 45. This winch is very complicated and expensive, and because the tool head is integral with shaft 45, a separate Eckles winch is required for each operation requiring the use of a winch.

The U.S. Pat. No. 4,951,890 to Sossamon discloses a powered fishing reel line rewinder. But the Sossamon patent cannot be used to perform the function of a winch.

The U.S. Pat. No. 4,269,246 to Larson discloses a powered fastener and drive assembly. However the Larson fastener and driver assembly is not related to winches for raising sails or anchors on sailboats.

The U.S. Pat. No. 4,962,901 to Shirley discloses a powered drive member for rewinding a fishing reel. The Shirley patent is not designed for use on winches for use on sailboats and The patent to Roberson relates to a cable pulling device. It is quite complicated and expensive and is not related in structure or purpose to a winch for raising sails on boats.

The U.S. Pat. No. 4,728,048 to Batson relates to another powered spooling device for winding line on a spool. It resembles the Shirely patent in purpose, and so it not designed to be used to raise sails on sailboats.

The patent to Henry relates to a screw driver shaft, and is not pertinent the present invention.

BRIEF DESCRIPTION OF OPERATION OF THE PRESENT INVENTION

Nautical winches have a number of standardized parts, such as centrally disposed crank head receiving sockets with rib receiving grooves for receiving the ribbed head of a crank. When the heads of the cranks used to operate the winch are inserted in the crank head receiving socket, the ribs on the crank head engage the rib receiving grooves in the socket to prevent slippage between the crank head and the head receiving socket when the crank is rotated.

In the present invention, the crank is replaced by an adaptor or tool for entering the crank head receiving socket of a conventional nautical winch. The portion of the adaptor which enters the crank head receiving socket of the winch has the same shape as the head of the crank which normally enters the head receiving socket. This adaptor is designed to be attached to a powered drill. In use the adaptor is inserted in the head receiving socket of a winch instead of the crank head and operation of the drill rotates the adaptor which causes the winch drum to rotate and winds the ropes connected to the sails onto the drum thereby raising the sail or lifting the anchor without manual effort by the crew. With this arrangement the powered drill and adaptor is simply carried from one winch to another as required so that the manually operated winches already in place can easily and economically be converted to a powered winch.

However, as stated before there is a danger that if the rope wound around the drum in a powered winch, should fall off the drum during winding, the rope could be chewed up before the drum can be stopped.

What is needed therefore is to provide a way to convert a manually powered winch to a powered winch so that the drum can be rotated easily. This requires the winch to have means for preventing the rope attached to the sails from being chewed up or frayed if the rope falls off the drum and to provide such a winch comprises an important object of this invention.

A further object of this invention is to provide an adaptor adapted to be connected to a powered drill, and sized to enter the head receiving socket of a crank operated mechanism.

Another object of this invention is to provide an adaptor for connection to a powered drill which is sized to enter the head receiving socket of the winch, and which has combined means for controlling the depth of penetration of the adaptor inside the head receiving socket and which also has means for preventing the rope on the drum from being torn or frayed if it falls off the drum while the rope is being wound.

These and other objects of this invention will become more apparent when better understood in the light of the accompanying drawing and specification wherein.

Figure 3:
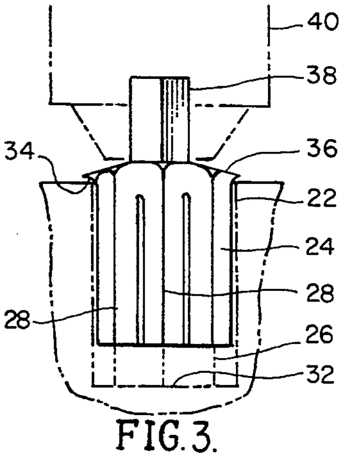
FIG. 3 is an enlarged elevational view showing the adaptor inserted in the crank head receiving socket of the winch and showing the stem of the adaptor inserted in the chuck of the drill.
Figure 6:
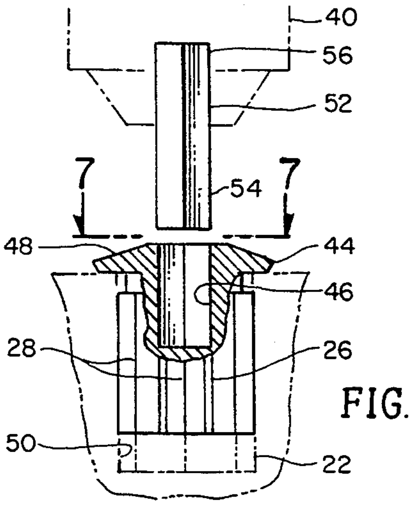
Figure 5:
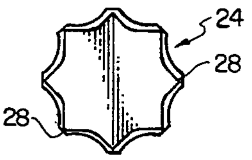
FIG. 5 is as sectional view on the line 5—5 of and showing the adaptor inside the crank head receiving socket of the winch with the ribs of the adaptor entering the rib receiving grooves in the crank head receiving socket.

FIG. 6 discloses a modified adaptor with the stem of the adaptor shown in FIG. 3 replaced by a centrally disposed stem receiving opening with one end of a stem inserted in the stem receiving opening and the other end of the stem inserted in the chuck of a drill.

Figure 7:
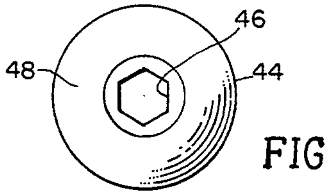

FIG. 7 is a plan view of the modified adaptor shown in FIG. 6 and disclosing the centrally disposed stem receiving opening in the adaptor.

Figure 1:
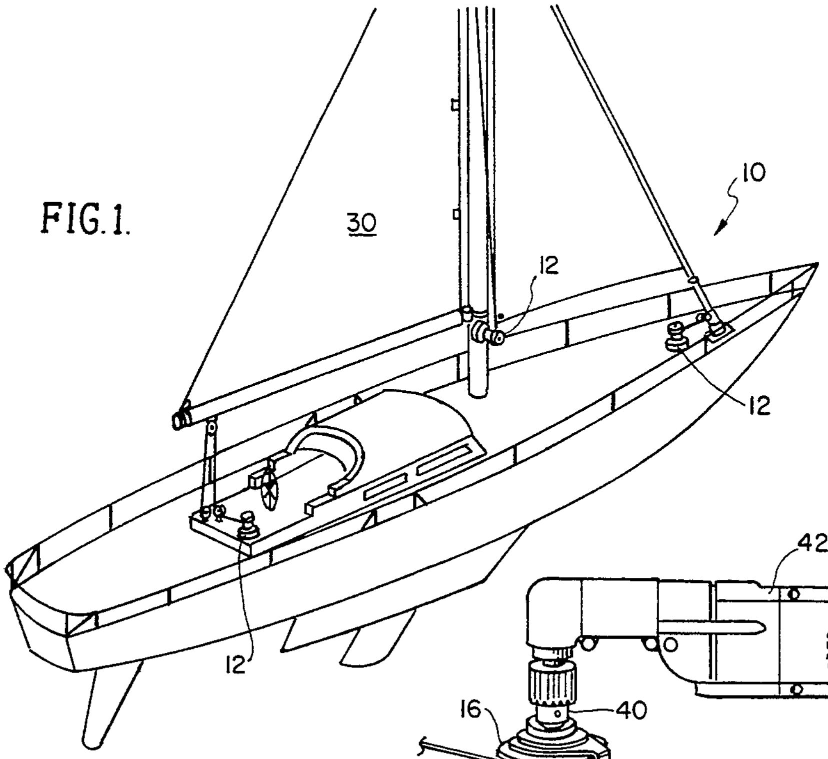
FIG. 1 is a perspective view of a sail boat showing a number of winches positioned to operated various sails and devices in the boat.

Referring now to FIG. 1 of the drawing. a sail boat has a number of unpowered winches 12 placed for easy use to perform a variety of functions such a raising sails or anchors etc. Each winch includes a cylindrical drum 14 having, in the embodiment shown, cylindrical end portions 16 and 18 which are larger in diameter than the hub to hold the wound rope 20 or anchor chain on the drum. The winch is provided with a centrally disposed crank head or adaptor receiving socket 22 for receiving the head of a crank or a correspondingly shaped adaptor 24. The socket 22 is provided with equally angularly spaced rib receiving grooves 26 positioned and shaped to receive equally angularly spaced ribs 28 formed on the periphery of the adaptor. The ribs 28 of the adaptor interlock with the rib receiving grooves in the head receiving socket 22. This arrangement prevents slippage between the adaptor 24 and the head receiving socket when the drum 14 of the nautical winch is rotated against heavy resistance when winding the ropes of a heavy sail 30 onto the drum.

The diameter and the position of the rib receiving grooves 26 in the crank head receiving socket are standard, but the depth of the socket may not be. If the depth of the socket 22 is greater than the length of the adaptor, there is a chance that the adaptor may fall to the bottom 32 of the socket which might make it difficult to retrieve.

This requires the adaptor to be designed so it performs a number of functions. First of all it is noted that the adaptor 24 is tapered upwardly at 34 enough so the diameter of the top 36 of the adaptor is greater than the diameter of the top of the head receiving socket. This prevents the adaptor from falling too far into the head receiving socket. In addition, is noted that the top 36 of the adaptor is smoothly rounded. In this way if the if the rope being wound on the drum falls off the drum onto the top 36 of the adaptor the rotation of the drum will not fray the rope.

The adaptor is provided with an integral stem 38 which extends upwardly from the top 36 of the adaptor. In the embodiment shown the stem 38 is hexagonal in cross section and is sized to fit into the chuck 40 of an electrical drill 42. With the arrangement shown, when the adaptor 24 is inserted into the head receiving socket 22 of the winch 12, and the drill is operated, the connection of the drill with the adaptor causes the drum of the winch to rotate and wind the rope on the drum and lift the heavy sail, without physical effort by the crew. Moreover the adaptor 24 and the drill 42 can be transferred from one winch to another as required so aany winch on the sail boat can be operated without effort.

The modified adaptor 44 shown in FIG. 6 does not have a stem 38. Instead, as shown in FIGS. 6 and 7 it has a centrally disposed stem receiving opening 46 extending downward from the top surface 48 of the adaptor. As shown in FIG. 7 this opening is also hexagonal in cross section. The periphery of the modified adaptor 44 has the same ribs 28 as the adaptor 24, and fits the interior surface 50 of the head receiving socket 22.

Figure 2:
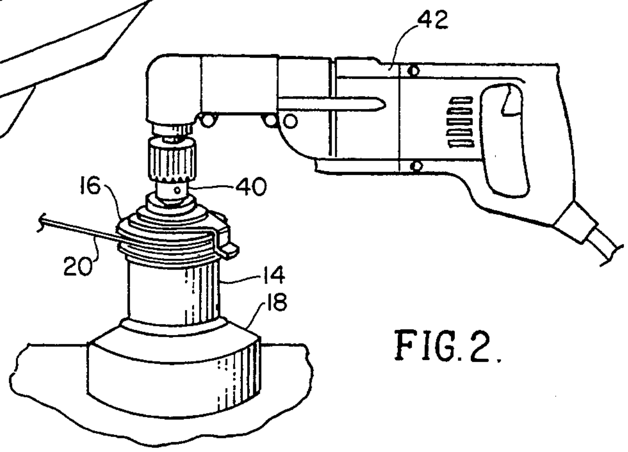
FIG. 2 is an elevational view of a winch used to raise a sail with an adaptor inserted in the head receiving socket of the winch and showing a powered drill connected to the adaptor.
Figure 4:
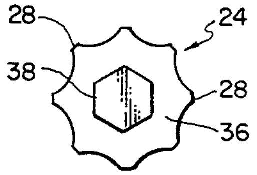
FIG. 4 is a plan view of the adaptor showing the stem adapted to enter the chuck of a tool.

One end 54 of an elongated stem 52 which is hexagonal in cross section is sized to fit snugly in the stem receiving opening 46. The opposite end 56 of the stem is sized to fit into the chuck 40 of an electric drill. When the drill is operated, and the modified adaptor is in the crank head receiving socket of the winch, the drum 14 of the winch rotates to wind up the rope onto the drum, lifting the sail, as described with the embodiment shown in FIG. 2.

With the stem seperate from the adaptor, the length of the stem can be chosen so the adaptor can reach winches or the crank head receiving sockets of other machinery, such as landing gears on airplanes where the landing wheels are stuck in an upward position, and where the machinery for operating the landing gears is located in a position which can only be reached by an electric drill with a stem long enough so the adaptor can enter the head receiving socket of the machinery.

Having described the invention, what I claim as new is:

1. In combination, a nautical winch for raising the sails or anchors on a sail boat by winding ropes attached to the sails onto the drum of the nautical winch, and an adaptor, said nautical winch having a head receiving socket for receiving the head of a crank for manually rotating said drum, said adaptor having the same shape as the head of the crank whereby the adaptor can be inserted in said head receiving socket in place of the head of the crank, said adaptor having a generally cylindrical body, said cylindrical body having a top portion and a socket penetrating portion, said top portion having combined means both for controlling the depth of penetration of the socket penetrating portion in said head receiving socket and for preventing the rope from being torn or frayed if the rope falls off the drum onto the top portion of the adaptor, said socket penetrating portion of said adaptor having a peripheral surface, formations on the peripheral surface of the body shaped to compliment and fit into formations in the head receiving socket in the nautical winch to prevent slippage between the adaptor and the nautical winch when the adaptor inside the crank head receiving socket is rotated, means for connecting said adaptor to a powered rotating device whereby operation of the device rotates said adaptor in said crank head receiving socket causing said winch to rotate and wind the ropes connected to the sails onto the winch drum without manual effort by the crew.

2. The combination described in claim 1 wherein said head receiving socket has an entrance, said socket penetrating portion of said adaptor upwardly tapered until the top portion has a diameter greater than the diameter of the entrance to said head receiving socket for controlling the depth of penetration of said socket penetrating portion into said head receiving socket, said top portion of said adaptor having an upper surface, said upper surface smoothly rounded to prevent chafing or tearing of the ropes being wound on the drum in case the rope falls off the drum onto the rotating upper surface of the top of the adaptor.

3. The combination described in claim 2 wherein a stem rigid with the adaptor extends upwardly from the said upper surface of said adaptor, said stem shaped to fit into the chuck of a power drill whereby operation of said power drill rotates said adaptor thereby rotating the drum of said nautical winch to raise the sail.

4. The combination described in claim 1 wherein the formations on the said peripheral surface of the body comprise ribs, said ribs shaped to interlock with rib receiving grooves formed in the walls of the head receiving socket to prevent slippage between the socket penetrating portion of said adaptor and the walls of the head receiving socket when the drum of the nautical winch is rotated against heavy resistance.

5. In combination, a nautical winch for raising the sails or anchors on a sail boat by winding ropes attached to the sails onto the drum of the nautical winch, and an adaptor, said nautical winch having a head receiving socket for receiving the head of a crank for manually rotating said drum, said adaptor having the same shape as the head of the crank whereby the adaptor can be inserted in said head receiving socket in place of the head of the crank, said adaptor having a generally cylindrical body, said body having a top portion and a socket penetrating portion, said socket penetrating portion formed with ribs, said ribs shaped to interlock with rib receiving grooves formed in the walls of the head receiving socket to prevent slippage between the socket penetrating portion of the adaptor and the walls of the head receiving socket when the winch is operated against heavy resistance, said top portion having a diameter greater than the entrance to said head receiving socket for controlling the depth of penetration of said socket penetrating portion into said head receiving socket and a centrally disposed stem receiving opening extending downward into the body of the adaptor, a removable stem, said stem having opposed ends, one end of said stem in said stem receiving opening, the other end of said stem adapted to be removably connected to the chuck of a powered drill whereby operation of said drill causes said adaptor to rotate thereby operating said winch and raising the sails, the cross sectional shape of the stem corresponding to the cross sectional shape of the stem receiving opening in the top of the adaptor and mad in such a way that the stem cannot rotate inside said stem receiving opening in the top portion of the adaptor.

* * * * *